United States Patent
Tanaka et al.

(10) Patent No.: US 6,211,492 B1
(45) Date of Patent: Apr. 3, 2001

(54) THERMALLY DEPOSITED PORTION STRUCTURE OF THERMOPLASTIC RESIN MOLDED PRODUCT

(75) Inventors: Masahiro Tanaka; Noboru Sato, both of Fukushima (JP)

(73) Assignee: Tohoku Munekata Co., Ltd., Fukushima-ken (JP)

( * ) Notice: Subject to any disclaimer, the term of this patent is extended or adjusted under 35 U.S.C. 154(b) by 0 days.

(21) Appl. No.: 09/452,642

(22) Filed: Dec. 1, 1999

(51) Int. Cl.$^7$ ........................................... H05B 1/00
(52) U.S. Cl. ................ 219/209; 219/544; 156/273.9; 156/274.2
(58) Field of Search ........................ 219/209, 210, 219/544, 202, 203, 535, 553; 428/343; 156/273.9, 274.2; 200/61.43; 49/28

(56) References Cited

U.S. PATENT DOCUMENTS

| | | | |
|---|---|---|---|
| 4,769,525 | * | 9/1988 | Leatham .............................. 219/209 |
| 4,788,404 | * | 11/1988 | Kent .................................... 219/209 |
| 4,853,520 | * | 8/1989 | Hochart et al. ..................... 219/535 |
| 5,045,666 | * | 9/1991 | Kent .................................... 219/209 |
| 5,175,409 | * | 12/1992 | Kent .................................... 219/209 |
| 5,407,514 | * | 4/1995 | Butts et al. ......................... 156/274.2 |
| 5,407,520 | * | 4/1995 | Butts et al. ......................... 156/274.2 |
| 5,591,364 | * | 1/1997 | Suppelsa et al. ..................... 219/209 |
| 5,620,794 | * | 4/1997 | Burkart et al. ..................... 428/343 |
| 5,938,956 | * | 8/1999 | Hembree et al. .................... 219/209 |
| 6,111,220 | * | 8/2000 | Hambree et al. .................... 219/209 |

* cited by examiner

Primary Examiner—Teresa Walberg
Assistant Examiner—Fadi H. Dahbour
(74) Attorney, Agent, or Firm—McGlew and Tuttle, P.C.

(57) ABSTRACT

The deposition strength is enhanced in the thermally deposited portion of thermoplastic resin molded product. In addition, in the test for obtaining the deposition strength, the shape and dimensions that can reach the purposed deposition strength is defined. If the annular groove (21) for fixing the heating element (30) is installed to the periphery of the deposited portion of lower case (20) and the annular rib (11) is fitted into the annular groove (21) is installed to the deposited portion of upper case (10) and if the diameter of heating element (30) to be used is considered to be D, then (a) the interval L between both the lateral walls in the annular groove 21 shall be set to 1.3 D L 1.6 D (b) the wall thickness T of annular rib shall be set to 1.1 D T 1.2 D (c) the height A of outside lateral wall in the annular groove shall be set to A 2 D (d) the height B of inside lateral wall in the annular groove shall be set to B 2 D, and (e) the height H of annular rib shall be set to H A.

3 Claims, 4 Drawing Sheets

THERMALLY DEPOSITED PORTION STRUCTURE OF THERMOPLASTIC RESIN MOLDED PRODUCT

FIELD OF THE INVENTION

The present invention relates to the structure of a thermally deposited portion for applying a heating element, heated by the impression of voltage, to the facing deposited portions of thermoplastic resin molded product to be deposited, melting, depositing and bonding the resin of the deposited portion by its heat generation.

BACKGROUND OF THE INVENTION

As a bonding method in the case of bonding the mutual molded products that are molded with the thermoplastic resin, it is publicly known that where the heating element is based on the electric resistance (hereinafter to be called resistance heating element) is caught or applied between the deposited portions, the voltage is impressed to the resistance heating element for its heating while pressure is applied with an adequate force, melting the resin of deposited portion with its heat, and then stopping the voltage to cool it down, thereby hardening the molten resin for depositing both the molded products with each other.

This deposition method can join the products within a shorter time than the method of using a bonding agent, the method of using an ultrasonic wave and the method of using high frequency electromagnetic induction, and the deposition method is an excellent method that can be put into practice with less of installation investment.

On the one hand, in case of using the bonding agent, a time is needed until the fixation, and the bonding agent becomes the cause for stain due to its ooze-out from the deposited portion. Further, in the case of using the supersonic wave and the high frequency induction, there is the fear of influencing the electronic parts if, for example, the electronic circuits are incorporated inside, a still greater installation is needed and causing much cost for that reason. In addition, the harmful influence on the working environment is also imaginable.

As described above, the thermal deposition method using the resistance heating element is an excellent deposition method, but the shape (structure and size) of the deposited portion to which the resistance heating element is mounted is crucial as the important factor of the deposition method.

For example, if the mounted porting is plane, the mounted position of resistance heating element can not be set up, and when the voltage is impressed, the resistance heating element is swollen by the heat generation temperature. For this reason, the resistance heating element gets out of the desired position, and the molten resin flows out to the other areas, and as a result a thin deposition layer is formed and therefore there is such a case that a satisfactory deposition strength can not be obtained.

Furthermore, in case of providing an annular groove to which the resistance heating element is mounted, the position of resistance heating element gets deviated if the width of annular groove should be too wide, the length of the annular rib to be fitted into the annular groove is short and the sufficient molten resin can not be obtained, which becomes the cause for not reaching a deposition strength that can be satisfied.

SUMMARY AND OBJECTS OF THE INVENTION

It is the primary object of this invention to present the thermal deposition structure that can obtain the satisfied deposition strength in the shape and size of the deposited portion when thermally depositing the thermoplastic resin molded products using the resistance heating element.

According to the invention, a thermally deposited portion structure of thermoplastic resin molded product is provided wherein the dimensions of deposited portions have been set in such a manner as:

(a) the interval L of both the walls in the annular groove may become $1.3\,D \leq L \leq 1.6\,D$;

(b) the wall thickness T of annular rib may become $1.1\,D \leq T \leq 1.2\,D$;

(c) the height A of outside lateral wall in the annular groove may become $A \geq 2\,D$;

(d) the height B of inside lateral wall in the annular groove may become $B \geq 2\,D$; and (e) the height H of annular rib may become $H \geq A$ if the annular groove for fixing the said heating element should be provided to the periphery of deposited portion of molded product on one hand, the annular rib being fitted into the annular groove should be provided so as to protrude to the deposited portion of molded product on the other hand and the diameter of the heating element should be considered to be D, in the structure of thermally deposited portion for catching in periphery the circular cross sectional heating element being heated by the voltage impression between the circular deposited portions opposing to the thermoplastic resin molded product in object of the thermal deposition, for melting the resin of deposited portion by the heat generation of this heating element and for depositing and bonding the opposite deposited portions.

According to another aspect of the invention, a thermally deposited portion structure of thermoplastic resin molded product is provided wherein the dimensions of deposited portion has been set in such a manner that:

(a) the interval L between both the lateral walls in the annular groove may become $1.3X \leq L \leq 1.6X$;

(b) the wall thickness T of annular rib may become $1.1X \leq T \leq 1.2X$;

(c) the height A of outside lateral wall in annular groove may become $A \geq 2Y$ (d) the height B of inside lateral wall in annular groove may become $B \geq 2Y$ (e) the height H of annular rib may become $H \geq A$ if the annular groove for fixing the heating element has been installed to the periphery of deposited portion of molded product on one hand and the annular rib being fitted into the annular groove has been protrusive installed to the deposited portion of molded product on the other hand and the diagonal length or opposite side length in parallel with the annular groove bottom face of the heating element should be considered to be X and the diagonal length or opposite side length in perpendicular direction to the annular groove should be considered to be Y, in the structure of thermally deposited portion for catching in periphery the heating element whose cross section is square or polygon being heated by the voltage impression between the peripheral deposited portions opposite to the thermoplastic resin molded product in object of the thermal deposition, and for melting the resin of deposited portion by the heat generation of this heating element and depositing and bonding the opposite deposited portions.

As a result of study for many years, the inventors have found out that the best thermal deposition can be obtained by forming the portion which engages a resistance heating element to have an appropriate shape in the thermoplastic resin molded product, and moreover by defining the shape and size in relation to the width size of the resistance heating element. This succeeded in allowing an easy determination of each shape and each size, wherein this was decided after repeating the test over several times.

For example, the lateral walls are arranged in parallel on both the sides of the resistance heating element and the mounting position can be regulated by forming the annular groove fixing the resistance heating element on one side deposited portion of opposite thermoplastic resin molded product to be deposited.

The invention also brings such an effect that the resin, in a molten state by the heat generation of resistance heating element, is prevented from flowing out to the other areas and the deposition layer will not become thin. Further, the protrusive annular rib can be formed around the deposited portion of molded product on the other side.

During the deposition, both the lateral walls become the guide and fit into the said annular groove, heating the resistance heating element while pressing the upper case against the lower case with an adequate pressure, and the resin in the annular groove and the resin in the annular rib reach a molten state with the heat and get mutually mixed. Thereafter if the resins are cooled down, the deposition layer where the desired deposition strength can be obtained can be formed. As the premise is thermally deposited in this way, the annular groove and annular rib shapes are based upon, the diameter of resistance heating element to be used is also based upon, and the dimensional relations of respective portions have been set up as follows:

First, if the diameter of resistance heating body should be D, then the interval L of both the lateral walls of annular rib is as follows:

In case of L<1.3 D: The interval is narrow when fixing the resistance heating-element to the annular rib, so problems appear.

In case of L>1.6 D: Because the fixation face of resistance heating element becomes wider than necessary, the fixation position can not be determined, and the position for the rib to get in touch with the resistance heating element is not uniform. Further, the molten resin volume filling the space formed by the annular groove and annular rib is in short supply, and the desired deposition strength can not be obtained.

Next, the wall thickness T of annular rib is as follows:

In case of T<1.1 D, the molten resin volume is in short supply, and the desired deposition strength can not be obtained.

In case of T>1.2 D, the calorific value of the resistance heating element is not sufficient, the melting becomes insufficient and the desired deposition strength can not be obtained.

In case of A<2 and B<2 D, both the lateral walls are too low, hence the molten resin flows out of the annular groove, and the deposition layer necessary for the sealing can not be formed.

In case of H<A, both the deposited portions get in touch with each other first before the sufficient molten resin can be obtained, and they can not be deposited.

The cross section of resistance heating element is square or polygon according to one embodiment of the invention though the cross section of the resistance heating element is a circle according to another embodiment, and the diagonal length or opposite side length of resistance heating element in a horizontal direction with the bottom face of the annular groove to which the resistance heating element is to be fixed is defined as X, and moreover the diagonal length or opposite side length of resistance heating element in perpendicular direction to the annular groove is defined as Y. Therefore, the interval and wall thickness are based on X and the height is based on Y, and each relation is as described below.

In case of joining the mutual molded products that have been molded with the thermoplastic resin, the desired deposition strength can be obtained by defining the thermally deposited structure to which the resistance heating element is fixed, in the deposition method for catching the heating element in the deposited portions, impressing the voltage to the said resistance heating element for its heat generation while pressurizing it with an adequate force, melting the resin in the deposited portion with its heat, then hardening the molten resin and depositing the molded products with each other by stopping the voltage for cooling it down.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
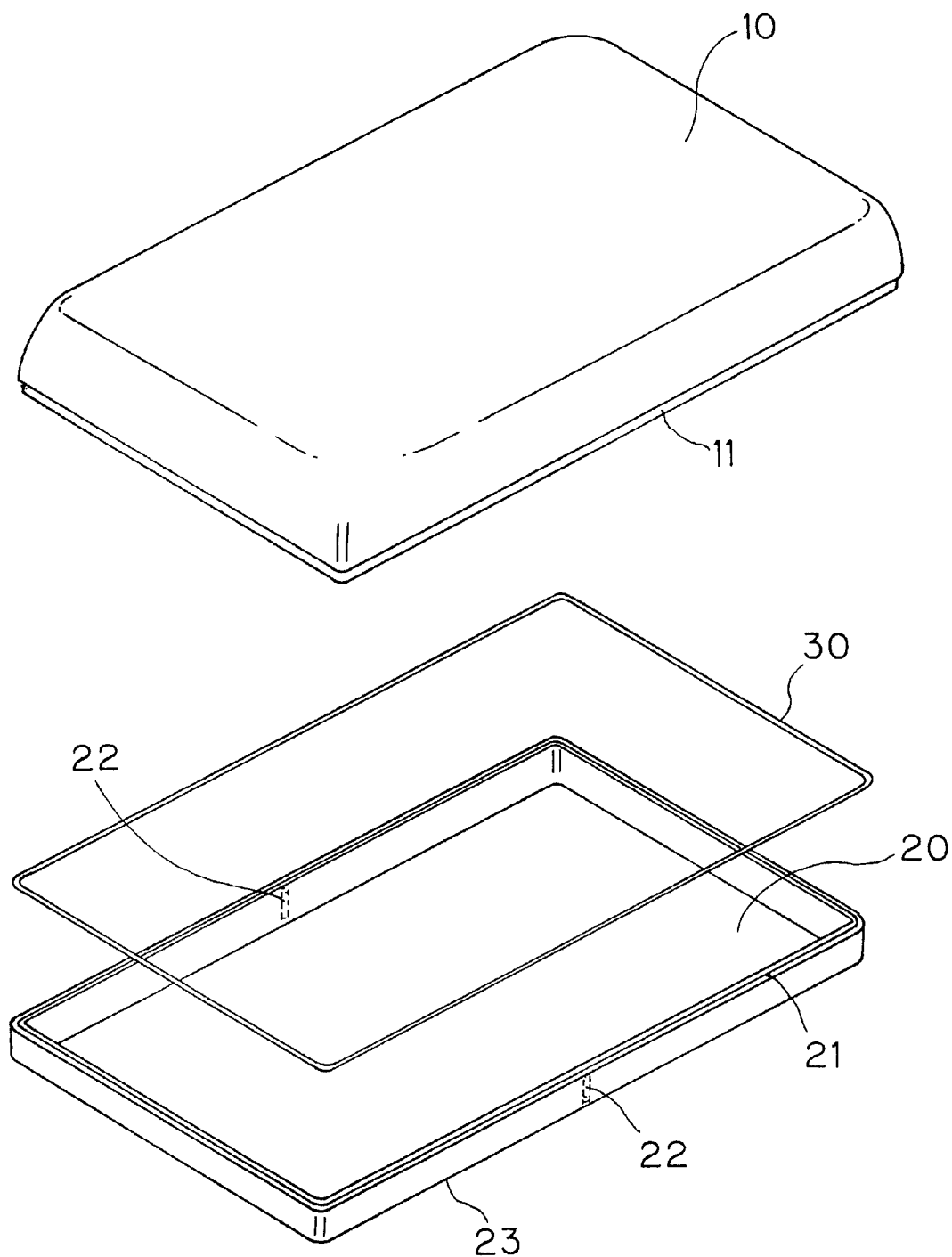
FIG. 1 is an explanatory exploded view of the thermally depositing of the upper case with the lower case according to a first embodiment of the invention.

FIG. 1 is an oblique view showing the sealing and thermally depositing of the upper case 10 and the lower case 20 molded using the polypropylene resin (PP), a thermoplastic resin, by use of the resistance heating element 30. Resistance heating element 30 has a ring shaped cross sectional circle. The voltage impression method with the resistance heating element 30 in the present embodiment is such as to provide to the bottom face 23 the through-hole 22 reaching the resistance heating element 30 that has previously been fixed to the annular groove 21 of lower case 20, inserting the voltage impression terminal 40 into through-hole 22 for its contact with the resistance heating element 30 for impressing the voltage.

Figure 2:
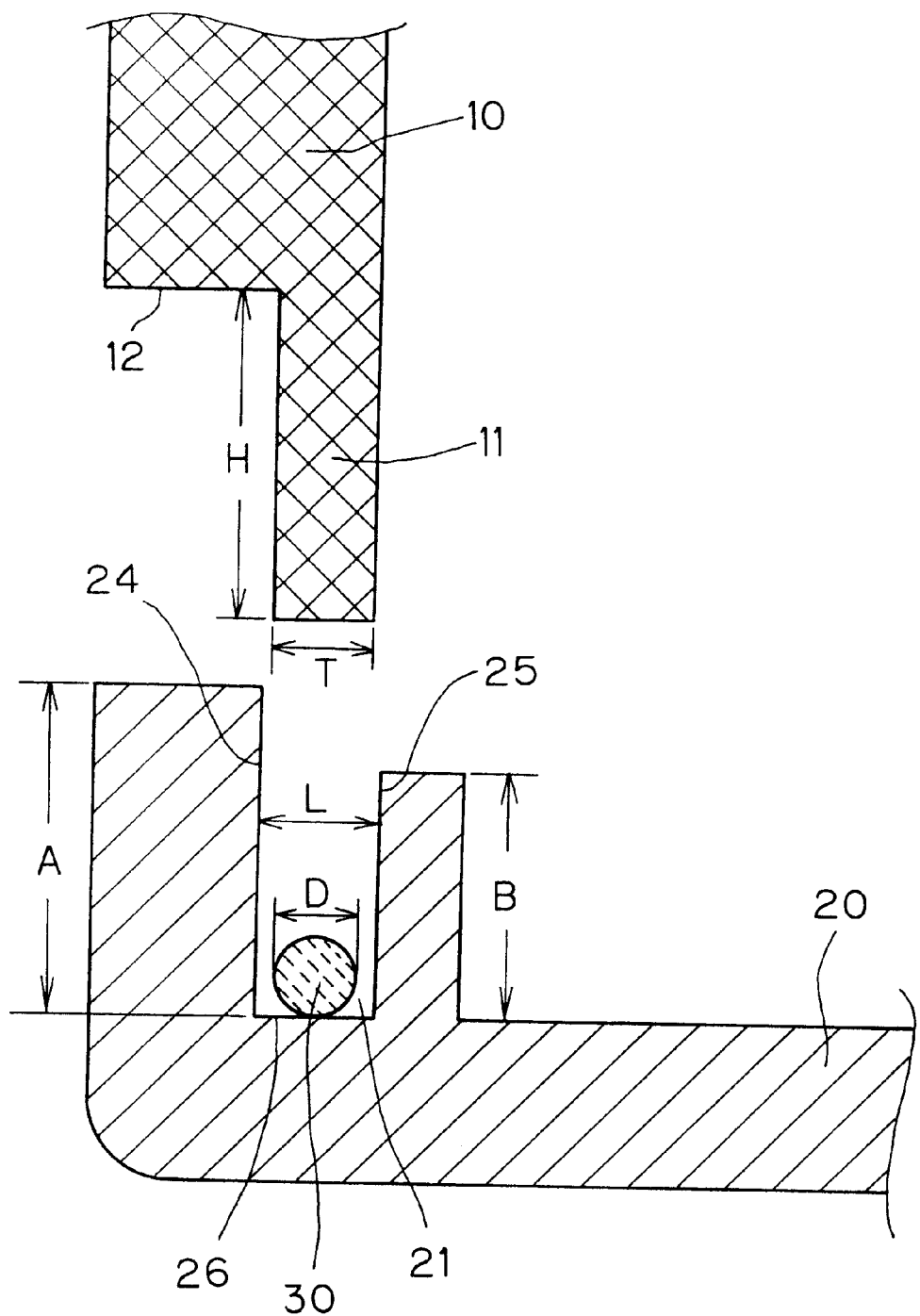
FIG. 2 is a cross sectional enlarged view of a thermally deposited portion according to the first embodiment of the invention.

FIG. 2 is an enlarged cross sectional view of thermally deposited portion. Numeral 30 is the resistance heating-element. The heating element uses SUS304 (WPB) material, its cross section is circular and its diameter D is 0.9 mm. The annular groove 21 for fixing the resistance heating-element is provided to the deposition portion around the lower case 20. Moreover, the outside lateral wall 24 and the inside lateral wall 25 are vertically installed on both the sides so that they may surround the resistance heating-element 30 from the annular groove bottom face 26.

The interval L between the outside lateral wall 24 and the inside lateral wall 25 was set to 1.3 mm. The height A of outside lateral wall 24 from the annular groove bottom face 26 was set to 3.0 mm, and in the same way, the height B of inside lateral wall 25 from the annular groove bottom face 26 was set to 2.0 mm. The reason why the outside lateral wall 24 was set higher than the inside lateral wall 25 is because of the land offset considering the enhancement of workability when fitting the upper case 10 into the lower case 20. However, both the heights may also be identical.

The annular rib 11 being fitted into the annular groove 21 is protrusively provided on the deposited portion of upper case 10, and the height H of annular rib 11 is set to 3.2 mm, and the wall thickness T is set to 1.0 mm.

Figure 3:
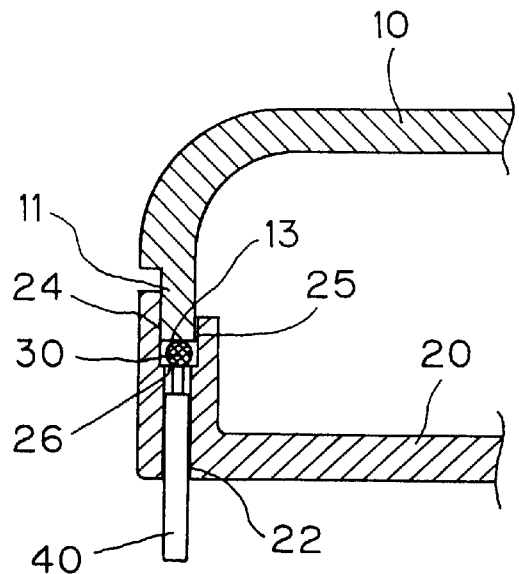
FIG. 3 is a cross sectional view of the position impressing the voltage to the resistance heating-element according to the first embodiment of the invention.

The method for thermally depositing the upper case 10 and lower case 20 whose deposited portions are formed as described above shall first fix the resistance heating-element 30 to the annular groove 21, then cover the upper case 10 on the lower case 20, and hold this situation with the adequate force being applied. FIG. 3 is the cross sectional view of the position where the voltage is impressed to the resistance heating-element 30, but the resistance heating-element 30 is surrounded by the annular groove bottom face 26, outside lateral wall 24, inside lateral wall 25 and the top panel 13 of annular rib 11 as known from FIG. 3.

The voltage impression method to the resistance heating-element 30 is to insert the respective voltage impression terminals 40 into the through-holes 22 at two places, to get them to contact with the resistance heating-element 30 and thus impressing the voltage. Thereby, the resistance heating-element 30 generates the heat, and the resins at the top panel 13 portion of annular rib 11 and at the annular groove bottom face 26 portion reach a molten state. The molten resins get mixed together, an will not flow out to the other area because they are surrounded by the periphery, but stay stagnant as if they surround the periphery of resistance heating-element 30, and moreover permeate into the spaces between the annular rib 11 and the outside lateral wall 24 and between the annular rib 11 and the inside lateral wall 25. If the voltage impression should be stopped for cooling down the resins, the molten resin gets hardened, gets integrated with the peripheral resin, thereby the upper case 10 can be thermally deposited with the lower case 20.

Figure 4:
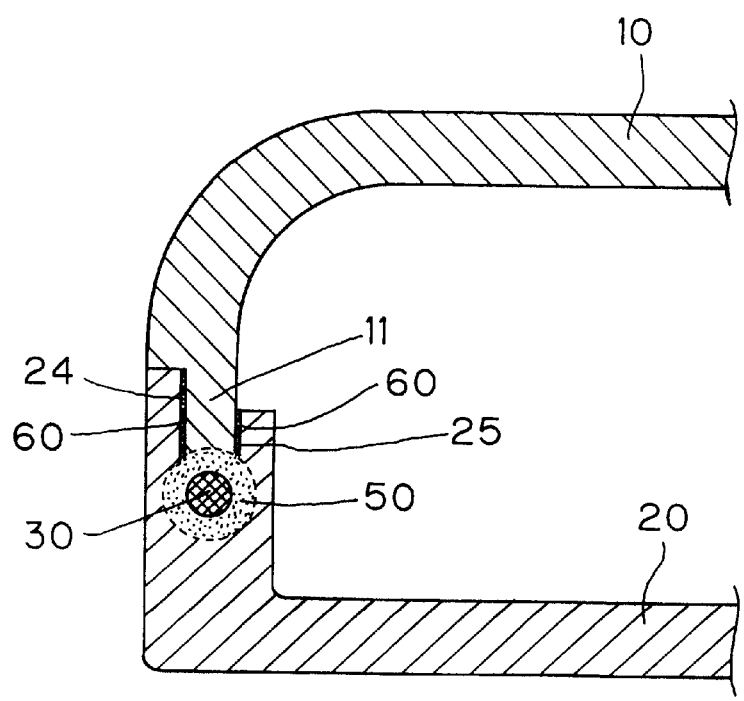
FIG. 4 is cross sectional view showing a completed deposition of the thermally deposited portion according to the first embodiment of the invention.

FIG. 4 shows the cross sectional-view of deposited portion other than the voltage impressed portion. Because of the deposited portion shapes using the respective sizes defined by this invention, a sufficiently thick deposition layer 50 can be obtained around the resistance heating-element 30, and moreover, the molten resin enters into the respective gap 0.2 mm between the outside lateral wall 24 and the annular rib 11 lateral side and between the inside lateral wall 25 and the annular rib 11 lateral side on account of the capillary phenomenon, coming from the relation of (a) the interval L of both the walls in the annular groove may become 1.3 D$\leq$L$\leq$1.6 D and (b) the wall thickness T of annular rib may become 1.1 D$\leq$T$\leq$1.2 D and thus the penetration deposition layer 60 of wide area can be obtained.

As a result, in addition to the deposition by the top panel 13 of annular rib 11 and the annular groove bottom face 26, the shearing stress due to the tensile stress and twist could be enhanced due to the deposition effect of both lateral sides of annular rib 11, and the case made of resin having the satisfactory deposition force could be obtained.

Table 1 through Table 3 shows the respective results of tensile strength, drop test and sealing test.

As the comparison example, the space L of outside lateral wall 24 and inside lateral wall 25 was set to 1.6 mm out of the respective dimensions in Embodiment 1, and the other sizes were set to the same numerical values.

Looking at the cross section of deposited portion after the thermal deposition, the deposition layer 60 became thin and the molten resin permeating into the gap proved to be insufficient because the cross sectional area surrounded by the outside lateral wall 24, inside lateral wall 25, annular groove bottom face 26 and the top panel 13 of annular rib 11 was widened.

As a result, the respective strengths of tensile strength, etc. dropped down below those according to the first embodiment of the invention.

Table 1 through Table 3 shows the respective results of tensile strength, drop test and sealing test.

The second embodiment of the invention is an embodiment uses the resistance heating-element 31 made of nickel-chrome alloy whose cross section is rectangle, as the resistance heating-element.

Figure 5:
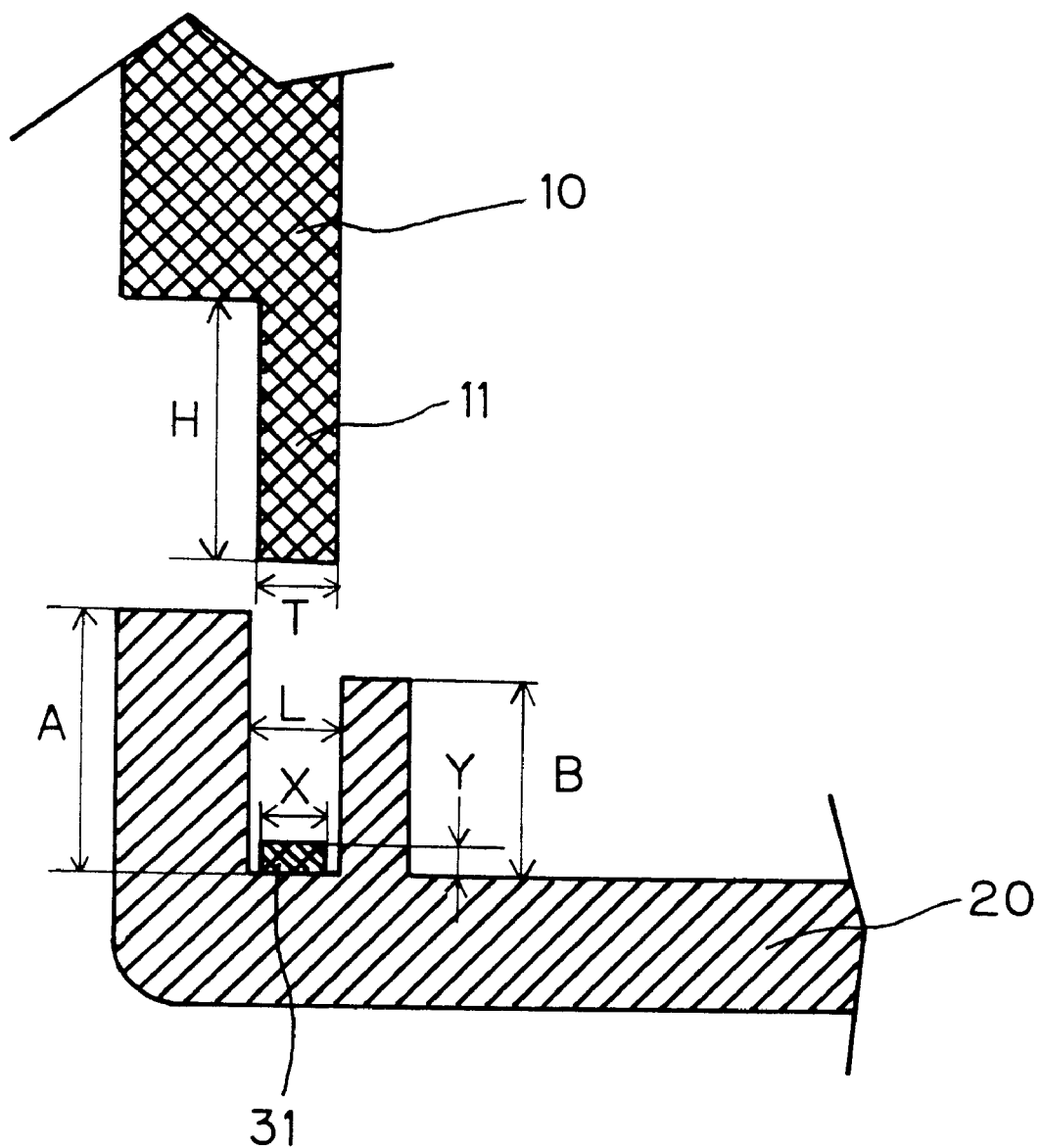
FIG. 5 is a cross sectional view of thermally deposited portion according to a second embodiment of the invention.

FIG. 5 shows an enlarged cross sectional view of thermally deposited portion. The dimension of resistance heating-element 31 used in this embodiment is 1.0 mm in the side width X, and 0.5 mm in the height Y. Therefore, the interval L between the outside lateral wall 24 and the inside lateral wall 25 was set to 1.4 mm, the wall thickness T of annular rib 11 was set to 1.15 mm, the height A of outside lateral wall 24 was set to 2.0 mm, the height B of inside lateral wall 25 was set to 1.5 mm, the height H of annular rib 11 was set to 2.2 mm, and the other sizes were set to the same sizes as Embodiment 1 in conducting the thermal deposition.

As a result, the case made of resin having a satisfactory deposition force could be obtained.

Table 1 through Table 3 shows the respective results of tensile strength, drop test and sealing test.

Each of embodiments introduced the example of using a ring shaped resistance heating-element for obtaining the case to be sealed, but the structure of thermally deposited portion according to this invention can be applied to all the structures of catching (engaging) and thermally depositing the heating element between the molded product that should be deposited.

Method of Each Test

Tensile strength test: The deposited portion was cut into 20×20 mm, and was tested using a tensile tester (Model Y10-C manufactured by Toyo Seiki Co., Ltd.).

Drop strength test: A plate of 450 g shall be fixed inside the case, and naturally dropped onto the concrete floor face from the height of 1 m. If the deposited portion should get separated even partially, the test result should be judged as no good.

Sealing test: A hole for connecting an air hose should be provided on a part of case, an air hose should be connected, and immersed into the water. The compressed air of 98 kPa should be fed to confirm if the foams are being generated or not.

TABLE 1

Result of tensile strength test

| | Embodiment 1 | Embodiment 2 | Comparison example |
|---|---|---|---|
| Sample 1 | 198 | 199 | 147 |
| Sample 2 | 195 | 196 | 140 |
| Sample 3 | 196 | 198 | 128 |

TABLE 2

Result of drop strength test

|  | Embodiment 1 | Embodiment 2 | Comparison example |
|---|---|---|---|
| Sample 1 | OK | OK | NG (no good) |
| Sample 2 | OK | OK | NG |
| Sample 3 | OK | OK | NG |

TABLE 3

Result of sealing test

|  | Embodiment 1 | Embodiment 2 | Comparison example |
|---|---|---|---|
| Sample 1 | No generation of foams | No generation of foams | Foams appeared from 2 places |
| Sample 2 | No generation of foams | No generation of foams | Foams appeared from several places |
| Sample 3 | No generation of foams | No generation of foams | Foams appeared from 3 places |

As described above, the present invention shapes the groove for fixing the heating element to the deposition face of molded product on one side and protrusive provided the rib to be fitted into the said groove on the deposition face of molded product on the other hand, and thereby can obtain a thick deposition layer concerning the shape of deposited portion with regard to the thermal deposition structure of the portion where the thermoplastic resin molded product is thermally deposited using a heating element. In addition, a satisfactory strength can be obtained by defining the sizes of groove and rib on the basis of the size of heating element. Concretely, the effects as follows can be obtained:

1. Because the periphery of heating element is surrounded with the resin which is to be made molten, the molten resin will not get expanded like the plane butt, but because the resin surrounds the heating element and gets hardened, the deposition layer can be formed thick.
2. Once the shape of heating element has been decided, it is enough to design it in the dimensional relation defined by this invention, and a satisfactory deposition strength can be reached with the less number of experiments which have been conducted many times in trial and error for every molded product in the past.
3. Because the molten resin permeates into the gap between the rib and the groove wall that were obtained from the dimensional relation defined in this invention, the deposition area can be obtained large, and the shearing stress due to the twist can be enhanced.

While specific embodiments of the invention have been shown and described in detail to illustrate the application of the principles of the invention, it will be understood that the invention may be embodied otherwise without departing from such principles.

APPENDIX

DESCRIPTION OF REFERENCE NUMERALS

10 Upper case
11 Annular rib
20 Lower case
21 Annular groove
24 Outside lateral wall
25 Inside lateral wall
26 Bottom face of annular groove
30 Resistance heating element
50 Deposition layer
60 Penetration deposition layer
A Height of outside lateral wall
B Height of inside lateral wall
D Diameter of heating element
H Height of annular rib
L Interval between outside lateral wall and inside lateral wall in the annular groove
T Wall thickness of annular rib
Y Diagonal length and opposite side length in perpendicular direction with the annular groove bottom face in the heating element.
X Diagonal length or opposite side length in horizontal direction with the annular groove bottom face in the heating element.

What is claimed is:

1. A thermally deposited portion structure of a thermoplastic resin molded product comprising:
    a heating element;
    a deposited portion having an annular rib with a wall thickness T;
    an opposite deposited portion having walls defining an annular groove, the walls including an outside lateral wall and an inside lateral wall, dimensions of the deposited portions being set in such a manner that
    (a) an interval L between the walls in the annular groove is $1.3\,D \leq L \leq 1.6\,D$;
    (b) the wall thickness T of the annular rib is $1.1\,D \leq T \leq 1.2\,D$;
    (c) a height A of the outside lateral wall in the annular groove is $A \geq 2\,D$;
    (d) a height B of the inside lateral wall in the annular groove is $B \geq 2\,D$; and
    (e) a height H of the annular rib is $H \geq A$ where D is the diameter of a circular cross section of the heating element, the heating element being applied to the periphery of the deposited portion, the annular rib, protruding from the deposited portion being fitted into the annular groove, the heating element being heated within the structure by the voltage impression between the deposited portion and the opposite deposited portion for melting the resin of the deposited portion and the opposite deposited portion by heat generation of the heating element and for depositing and bonding the deposited portion and the opposite deposited portion.

2. A thermally deposited portion structure of thermoplastic resin molded product, the structure comprising:
    a heating element;
    a deposited portion having an annular rib with a wall thickness T;
    an opposite deposited portion having walls defining an annular groove, the walls including an outside lateral wall and an inside lateral wall, dimensions of the deposited portions being set in such a manner that:
    (a) an interval L between both the lateral walls in the annular groove is $1.3\,X \leq L \leq 6\,X$;
    (b) the wall thickness T of the annular rib is $1.1\,X \leq T \leq 1.2\,X$;
    (c) a height A of outside lateral wall in annular groove is $A \geq 2\,Y$
    (d) a height B of inside lateral wall in annular groove is $B \geq 2\,Y$
    (e) a height H of annular rib is $H \geq A$ and wherein the annular groove for fixing the heating element is installed to the periphery of the deposited portion and the annular rib is fitted into the annular groove, and wherein the diagonal length or opposite side length in parallel with the annular groove bottom face of the heating element is X and the diagonal length or opposite side length in perpendicular direction to the annular groove is Y, the heating element whose cross section is square or polygon being heated within the structure by voltage impression between the deposited portion and opposite deposited portion for melting the resin of the deposited portions by the heat generation of the heating element and depositing and bonding the deposited portion to the opposite deposited portion.

3. A thermally deposited portion structure of a thermoplastic resin molded product comprising:

an annular heating element;

a deposited portion having an annular rib with a wall thickness T;

an opposite deposited portion having walls defining an annular groove, the walls including an outside lateral wall and an inside lateral wall, dimensions of the deposited portions being set in such a manner that (a) an interval L between the walls in the annular groove is $1.3\,D \leq L \leq 1.6\,D$;

(b) the wall thickness T of the annular rib is $1.1\,D \leq T \leq 1.2\,D$;

(c) a height A of the outside lateral wall in the annular groove is $A \geq 2\,D$;

(d) a height B of the inside lateral wall in the annular groove is $B \geq 2\,D$; and (e) a height H of the annular rib is $H \geq A$ where D is the diameter of a circular cross section of the heating element, the heating element being applied to the deposited portion, the annular rib being fitted into the annular groove, the heating element being heated within the structure by the voltage impression between the deposited portion and the opposite deposited portion for melting the resin of the deposited portion and the opposite deposited portion by heat generation of the heating element and for depositing and bonding the deposited portion and the opposite deposited portion.

\* \* \* \* \*